United States Patent

Dickey et al.

Patent Number: 5,371,947
Date of Patent: Dec. 13, 1994

[54] CIRCULAR SAW CONVERSION APPARATUS

[76] Inventors: Richard J. Dickey; Timothy L. Mallett, both of 705 Sunset Dr., Independence, Mo. 64050

[21] Appl. No.: 226,932
[22] Filed: Apr. 13, 1994
[51] Int. Cl.⁵ ............................ B25F 3/00
[52] U.S. Cl. .................... 30/122; 30/500; 408/20; 408/241 R
[58] Field of Search ............ 30/122, 166.3, 296.1, 30/388, 500; 83/574; 408/20, 241 R, 234

[56] References Cited

U.S. PATENT DOCUMENTS

| | | | |
|---|---|---|---|
| 2,714,905 | 8/1955 | Clayton | 408/20 |
| 3,800,838 | 4/1974 | Morse . | |
| 4,317,282 | 3/1982 | Pace | 30/500 |
| 4,649,644 | 3/1987 | Huddleston | 30/122 |
| 4,841,643 | 6/1989 | Colella et al. | 30/500 |
| 4,876,793 | 10/1989 | Quaglia | 30/122 |
| 4,949,463 | 8/1990 | Chen | 30/500 |
| 4,972,589 | 11/1990 | Povleski | 30/500 |

Primary Examiner—Richard K. Seidel
Assistant Examiner—Hwei-Siu Payer

[57] ABSTRACT

An elongate pair of spaced support flanges is arranged in a parallel coextensive relationship pivotally mounting an elongate housing at a first end of the flanges, with the second end of the flanges having a support yoke oriented at an acute angle relative to the support flanges, such that a drill member mounted onto the yoke between the support flanges is in operative communication with the elongate housing, with the elongate housing mounting a circular saw at an obtuse angular orientation relative to the drill to provide for angled cutting and clearance during an angle cut.

3 Claims, 2 Drawing Sheets

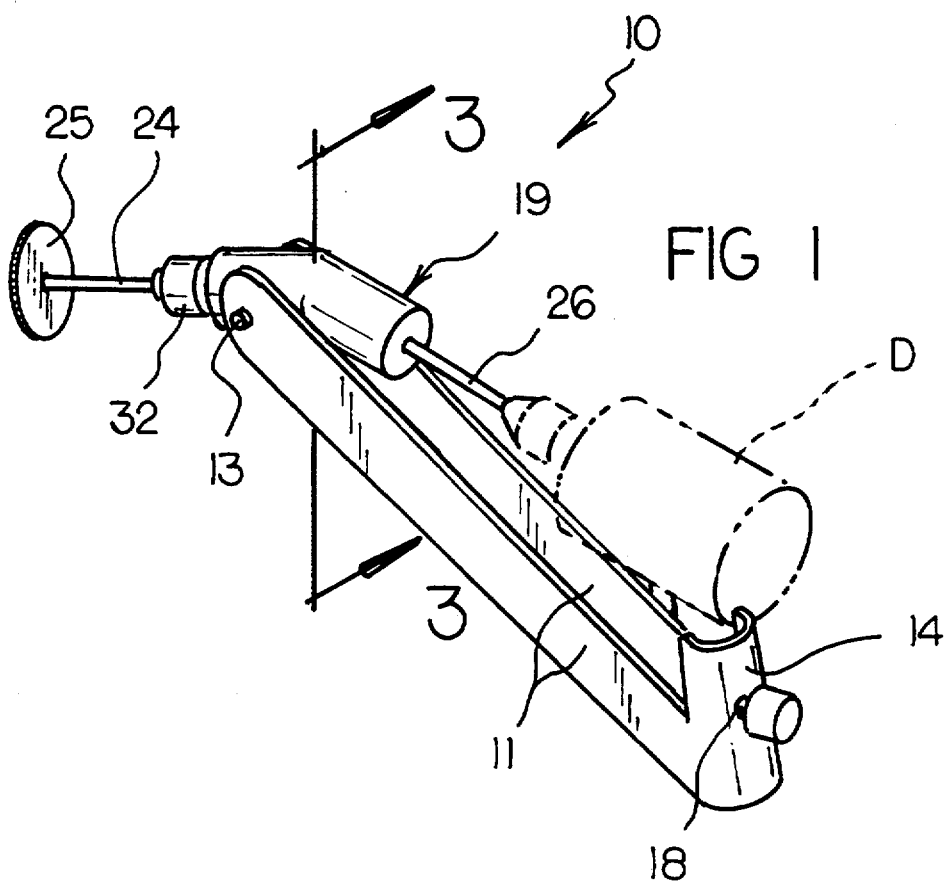
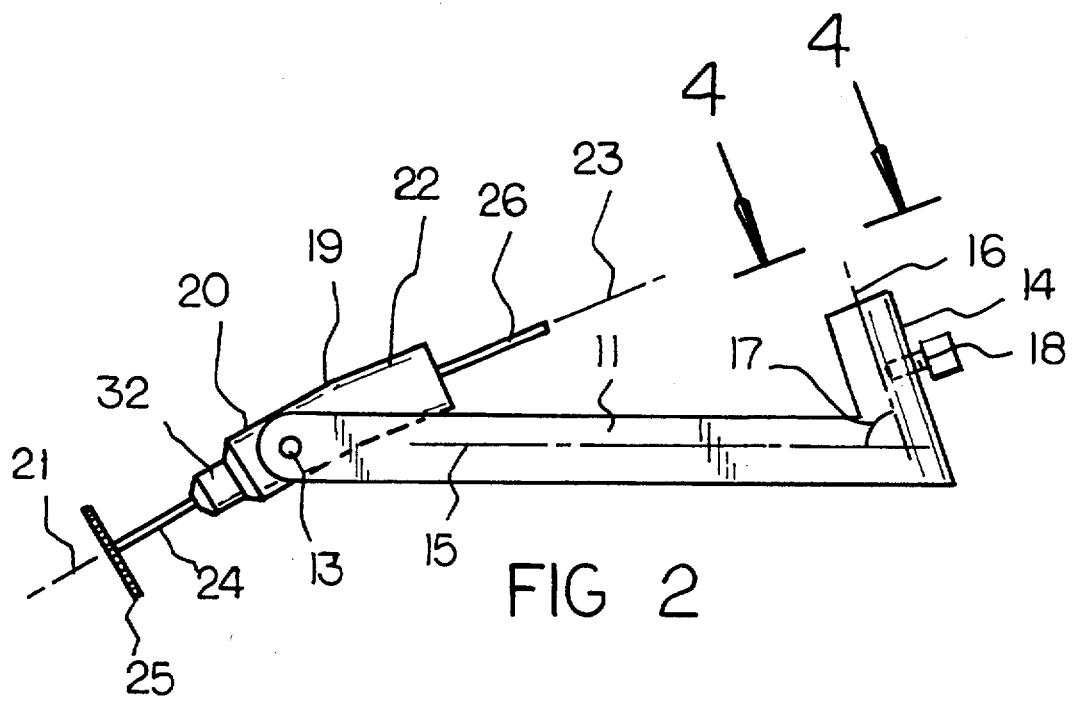

CIRCULAR SAW CONVERSION APPARATUS

BACKGROUND OF THE INVENTION

1. Field of the Invention

The field of invention relates to circular saw adapter structure, and more particularly pertains to a new circular saw conversion apparatus wherein the same is arranged to drive a circular saw from a rotary drill mounted within a support framework.

2. Description of the Prior Art

Circular saw conversion structure is indicated and exemplified by U.S. Pat. Nos. 3,800,838; 4,649,644; 4,972,589; and 4,949,463.

The instant invention attempts to overcome deficiencies of the prior art by providing for a circular saw structure arranged for ease of accommodation of a rotary drill to effect the severing of a workpiece providing clearance relative to the drill and in this respect, the present invention substantially fulfills this need.

SUMMARY OF THE INVENTION

In view of the disadvantages inherent in the known types of circular saw apparatus now present in the prior art, the present invention provides a circular saw conversion apparatus wherein the same is arranged to mount a circular saw and orient the circular saw and its drive shaft at an angular orientation relative to a drill assembly.

To attain this, the present invention provides an elongate pair of spaced support flanges arranged in a parallel coextensive relationship pivotally mounting an elongate housing at a first end of the flanges, with the second end of the flanges having a support yoke oriented at an acute angle relative to the support flanges, such that a drill member mounted onto the yoke between the support flanges is in operative communication with the elongate housing, with the elongate housing mounting a circular saw at an obtuse angular orientation relative to the drill to provide for angled cutting and clearance during an angle cut.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important therefore, that the claims be regarded as including such equivalent constructions insofar as they do not depart from the spirit and scope of the present invention.

It is an object of the present invention to provide a new circular saw conversion apparatus which may be easily and efficiently manufactured and marketed.

It is a further object of the present invention to provide a new circular saw conversion apparatus which is of a durable and reliable construction.

An even further object of the present invention is to provide a new circular saw conversion apparatus which is susceptible of a low cost of manufacture with regard to both materials and labor, and which accordingly is then susceptible of low prices of sale to the consuming public, thereby making such circular saw conversion apparatus economically available to the buying public.

Still yet another object of the present invention is to provide a new circular saw conversion apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein: FIG. 1 is an isometric illustration of the invention FIG. 2 is an orthographic side view of the invention.

DESCRIPTION OF THE PREFERRED EMBODIMENT

Figure 3:
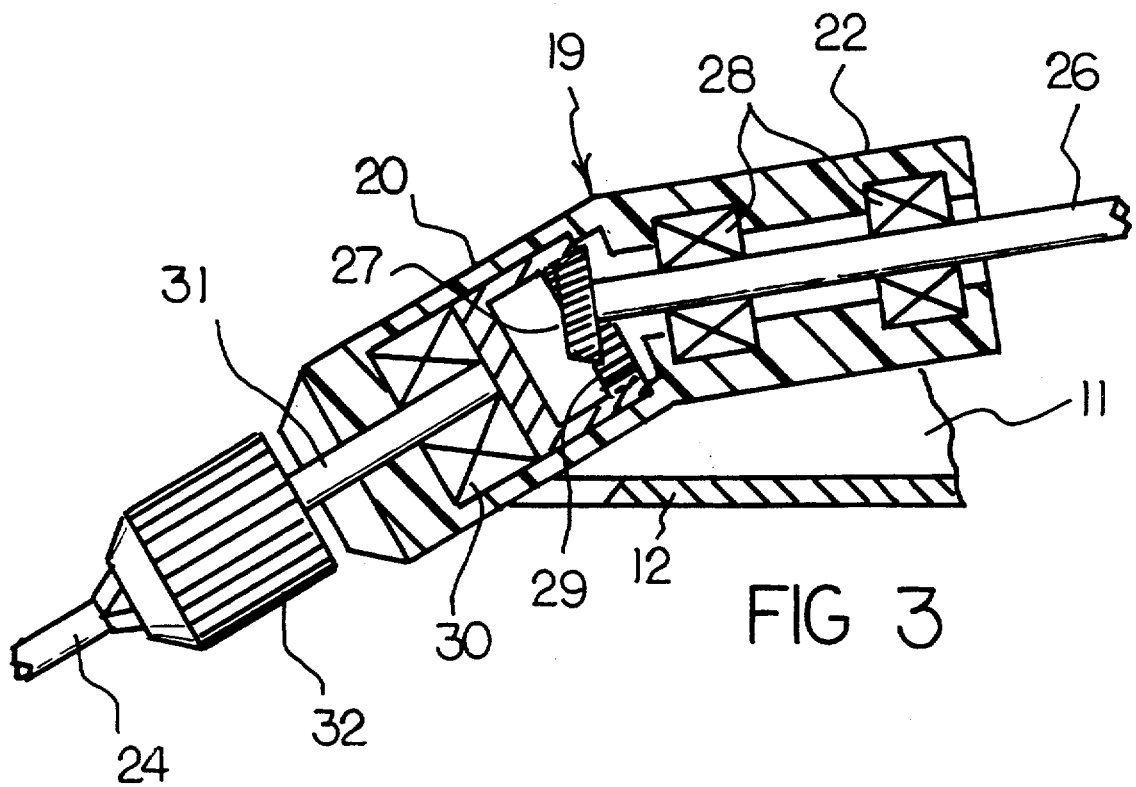
FIG. 3 is an orthographic view, taken along the lines 3—3 of FIG. 1 in the direction indicated by the arrows.

With reference now to the drawings, and in particular to FIGS. 1-4 thereof, a new circular saw conversion apparatus embodying the principles and concepts of the present invention and generally designated by the reference numeral 10 will be described.

Figure 4:
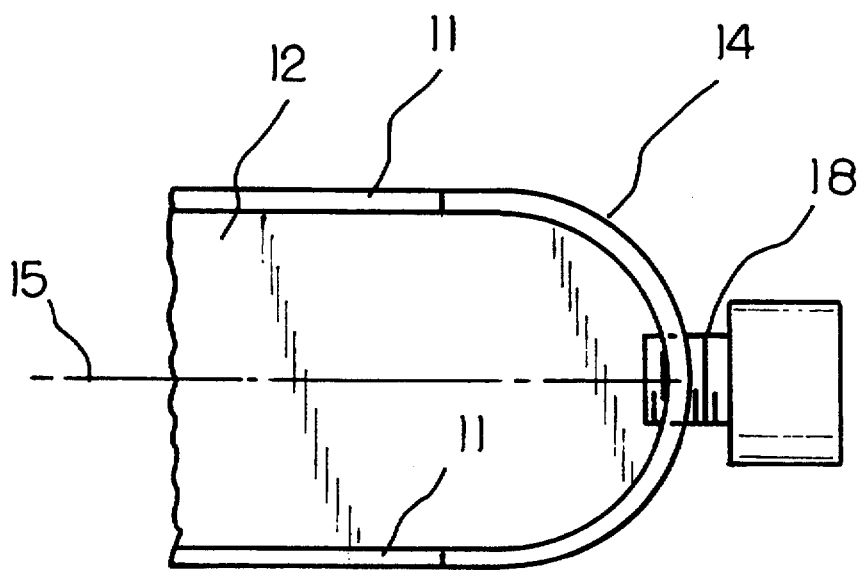
FIG. 4 is an orthographic view, taken along the lines 4—4 of FIG. 2 in the direction indicated by the arrows.

More specifically, the circular saw conversion apparatus 10 of the instant invention comprises spaced support flanges 11 arranged in a parallel coextensive: relationship relative to one another, with a reinforcing web 12 mounted to the support flanges 11 in an orthogonal relationship to position the support flanges spaced relative to one another and limit flexing of the support flanges. An axle 13 is orthogonally directed through the support flanges adjacent a first end of the support flanges, with a second end of the support flanges fixedly mounted to a support yoke 14 oriented such that a flange axis 15 directed coextensively of and longitudinally between the flanges 11 intersects a yoke axis 16 at an acute included angle 17. In this manner, a drill "D", such as illustrated in FIG. 1, is mounted with its handle received within the support yoke 14 and arranged to cant the drill "D" towards the axle 13. An abutment screw rod 18, as shown in FIG. 4, is directed through the yoke 14 orthogonally relative to the yoke axis 16 and is arranged to provide a compression and securement of the drill "D" as it is directed towards an input shaft 26 on the elongate housing 19, with the drill chuck receiving the input shaft 26.

The elongate housing 19 includes a first housing 20 symmetrically oriented about a first housing axis 21 integrally mounted to a second housing 22 symmetrically oriented about a second housing axis 23, with the first housing axis 21 and the second housing axis 23 defining an obtuse included angle to tilt the output shaft 24 of the relative to the input shaft 26. The output shaft 24 includes a rotary saw blade 25 orthogonally oriented relative to the output shaft 24, with the saw blade being operable to rotatably sever a workpiece. With reference to FIG. 3, the input shaft 26 mounted between spaced first bearings 28 terminates in a drive gear 27 that in turn drives a driven gear 29 supported by second bearings 30 and mounted to the driven gear shaft 31. The driven gear shaft 31 terminates in a collet 32 positioned exteriorly of the first housing 20 and coaxially aligned to couple with the output shaft 24 to impart rotation to the blade 25. The angle between the shafts 24, 26 allows the saw 10 to be utilized in tight corners and other confined spaces.

As to the manner of usage and operation of the instant invention, the same should be apparent from the above disclosure, and accordingly no further discussion relative to the manner of usage and operation of the instant invention shall be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A circular saw conversion apparatus comprising:
   a pair of spaced support flanges arranged in a parallel and coextensive relationship relative to one another, the support flanges each having a first end and a second end, with the support flanges symmetrically oriented about a flange axis;
   a reinforcing web orthogonally mounted to the support flanges and coextensive therewith;
   an axle orthogonally directed through the support flanges adjacent said first end of said support flanges;
   a semi-cylindrical yoke mounted to the support flanges at the said second end of the support flanges, with the yoke symmetrically oriented about a yoke axis, with the yoke axis oriented at an acute included angle relative to the flange axis;
   an elongate housing pivotally mounted about the axle, with the elongate housing having an input shaft arranged to receive a drill chuck of a drill thereon, an output shaft, wherein the input shaft and the output shaft are oriented at an oblique included angle relative to one another, with the output shaft having a circular saw blade mounted fixedly and orthogonally to the output shaft, whereupon rotation of the input shaft effects rotation of the output shaft and the circular saw blade.

2. An apparatus as set forth in claim 1, wherein the elongate housing includes a first housing symmetrically oriented about a first housing axis, and a second housing symmetrically oriented about a second housing axis, wherein the first housing axis and the second axis define an obtuse included angle therebetween; and further comprising a drive gear mounted to the input shaft within the elongate housing, a driven gear in mesh with the drive gear, the driven gear including a driven gear shaft extending through the first housing, with the driven gear shaft projecting beyond the first housing and including a collet positioned exteriorly of the first housing coaxially aligned relative to the first housing axis, the collet having the output shaft secured within the collet.

3. An apparatus as set forth in claim 2, and further comprising an abutment screw rod directed through the yoke and oriented orthogonally relative to the yoke axis to compress and secure the drill within the yoke and in engagement with the input shaft.

* * * * *